United States Patent
Aubourg

(10) Patent No.: US 6,527,014 B1
(45) Date of Patent: Mar. 4, 2003

(54) FLEXIBLE DUCT INSULATION HAVING IMPROVED FLAME RESISTANCE

(75) Inventor: Patrick F. Aubourg, Granville, OH (US)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 216 days.

(21) Appl. No.: 09/724,423

(22) Filed: Nov. 28, 2000

Related U.S. Application Data

(63) Continuation-in-part of application No. 09/451,658, filed on Nov. 30, 1999, now abandoned.

(51) Int. Cl.$^7$ .................................................. F16L 9/14
(52) U.S. Cl. ................................ 138/149; 138/DIG. 2; 428/34.5
(58) Field of Search ........................... 138/149, DIG. 2, 138/125, 123, 124; 428/34.5

(56) References Cited

U.S. PATENT DOCUMENTS

| | | | | |
|---|---|---|---|---|
| 3,941,159 A | * | 3/1976 | Toll | 138/147 |
| 4,101,700 A | | 7/1978 | Ray, Jr. et al. | 428/131 |
| 4,177,077 A | | 12/1979 | Gagin | 106/50 |
| 4,410,014 A | | 10/1983 | Smith | 138/149 |
| 4,615,988 A | | 10/1986 | Le Moigne et al. | 501/30 |
| 4,692,288 A | | 9/1987 | Rossmann et al. | 264/56 |
| 4,708,977 A | | 11/1987 | Miutel et al. | 523/402 |
| 4,842,908 A | * | 6/1989 | Cohen et al. | 138/149 |
| 4,874,648 A | * | 10/1989 | Hill et al. | 138/110 |
| 5,104,701 A | * | 4/1992 | Cohen et al. | 138/149 |
| 5,526,849 A | | 6/1996 | Gray | 138/133 |
| 5,554,324 A | | 9/1996 | Bernard et al. | 264/8 |
| 5,616,525 A | | 4/1997 | Rapp et al. | 501/35 |
| 5,932,499 A | | 8/1999 | Xu et al. | 501/35 |

FOREIGN PATENT DOCUMENTS

| | | |
|---|---|---|
| JP | 52-082941 A | 7/1977 |
| JP | 9-270208 | 1/1998 |
| WO | WO 89/12032 | 12/1989 |

\* cited by examiner

*Primary Examiner*—Patrick Brinson
(74) *Attorney, Agent, or Firm*—Inger H. Eckert; Stephen W. Barns

(57) ABSTRACT

A flame resistant insulation product comprises a fibrous mineral material that has been rotary fiberized, preferably a fibrous glass. The composition of the mineral material has a softening point of at least about 699° C. An insulated duct includes a tubular wall that defines a hollow interior for conducting a fluid, and a layer of the insulation product wrapped about the wall. The mineral material reduces the number of samples of the insulated duct failing the flame penetration test of a UL 181 Standard compared to the same insulated duct with a mineral material having a softening point of less than 699° C.

14 Claims, No Drawings

FLEXIBLE DUCT INSULATION HAVING IMPROVED FLAME RESISTANCE

RELATED APPLICATION

This application is a Continuation-In-Part of U.S. patent application Ser. No. 09/451,658, filed Nov. 30, 1999 now abandoned.

TECHNICAL FIELD AND INDUSTRIAL APPLICABILITY OF THE INVENTION

This invention relates generally to insulated flexible ducts for use in heating and air conditioning applications, and more particularly to an insulation product for a flexible duct having improved flame resistance.

BACKGROUND OF THE INVENTION

Various types of insulated flexible ducts are known for use in heating and air conditioning applications. Because the flexible ducts are employed in buildings, the ducts are subject to local building codes and regulations. To comply with building codes and receive a UL rating, flexible air ducts must pass a UL 181 Standard. This standard includes many requirements relating, e.g., to strength, corrosion, mold growth and burning characteristics. The requirement of interest in the present invention is a flame penetration requirement. Current flexible ducts do not always pass the flame penetration test of the UL 181 Standard. Passing the flame penetration test is particularly an issue for flexible ducts containing a relatively thin layer of insulation, e.g., an insulation layer having an R value of 0.74 $m^{2°}$ K/W.

Efforts have been made to improve the flame resistance of insulated flexible ducts. For example, U.S. Pat. No. 5,526,849 describes a flexible duct including a flame resistant yarn helix disposed between the inner and outer walls of the duct. This structure requires additional material and cost. U.S. Pat. No. 4,410,014 describes a flexible duct including a glass fiber scrim laminated to the insulation to improve the flame resistance of the duct. Drastically increasing the weight of the scrim greatly increases the probability of passing the flame penetration test, but at an unacceptable cost.

Thus, it would be desirable to provide an insulation product for a flexible duct having improved flame resistance.

SUMMARY OF THE INVENTION

The above object as well as others not specifically enumerated are achieved by a flame resistant insulation product according to the invention. The insulation product comprises a fibrous mineral material that has been rotary fiberized, preferably a fibrous glass. The composition of the mineral material has a softening point of at least about 699° C. An insulated duct according to the invention includes a tubular wall that defines a hollow interior for conducting a fluid, and a layer of the insulation product wrapped about the wall. The mineral material improves the flame penetration resistance of the insulated duct as measured by the flame penetration test of a UL 181 Standard compared to the same insulated duct with a mineral material having a softening point of less than 699° C.

Various objects and advantages of this invention will become apparent to those skilled in the art from the following detailed description of the preferred embodiment.

DETAILED DESCRIPTION AND PREFERRED EMBODIMENTS OF THE INVENTION

The flame resistant insulation product of the invention comprises a network of intertwined fibers of mineral material. Mineral fiber insulation is well known and has been a commercial product for an extended period of time. Such insulation can be formed from fibers of mineral material such as glass, rock, slag or basalt. Preferably, the insulation product is formed from glass fibers such as fibrous glass wool.

The insulation product is made from mineral material fibers that have been fiberized by a rotary process. In the rotary process, molten mineral material is introduced into a spinner having a plurality of fiber-forming orifices in its peripheral wall. Rotation of the spinner causes the molten mineral material to flow by centrifugal force through the orifices and form fibers. The fibers flow down from the spinner and are collected. The fibers are usually coated with a binder as they flow down from the spinner. A conveyor typically collects the binder-coated fibers in the form of a blanket, and the blanket is heat cured to produce the final insulation product. Insulation materials of various densities can be produced by varying the conveyor speed and the thickness of the cured insulation. Preferably, the insulation product is fibrous glass wool having a density within a range of from about 8 $kg/m^3$ to about 48 $kg/m^3$.

The present invention improves the flame resistance of the insulation product by increasing the softening point of the mineral material when compared with conventional mineral material, and thereby increasing the viscosity of the mineral material at the temperature of the flame in the flame penetration test of the UL 181 Standard. The composition of the mineral material has a softening point of at least about 699° C., preferably at least about 703° C., more preferably at least about 707° C., and most preferably at least about 710° C. The softening point is defined as the temperature at which the viscosity of the mineral material is $10^{7.6}$ poise, as measured according to ASTM C338. Of course this parameter, like any other parameter mentioned in this application, can be measured by any other suitable test.

The mineral material having a softening point of at least about 699° C. increases the probability of the insulated duct passing the flame penetration test of the UL181 Standard compared to the same insulated duct with a mineral material having a softening point of less than 699° C. Preferably, the new mineral material reduces the number of insulated ducts failing the flame penetration test by at least about 15%, more preferably by more than about 30%, and most preferably by more than about 50%.

While not intending to be limited by theory, it is hypothesized that increasing the softening point and the viscosity of the mineral material improves the flame resistance of the insulation product by reducing the chances of a flame penetrating the product. In the flame penetration test of the UL 181 Standard, a sample of the insulated air duct is mounted in a frame, loaded with a weight and placed over a flame at 774° C. Failure occurs if either the weight falls through the sample or the flame penetrates the sample during the 30 minutes of the test. Research indicates that the mineral material of the sample softens and forms a film or crust on its surface in contact with the flame. The film stretches and deforms under the load of the weight, and eventually forms a hole that allows penetration of the flame. It is hypothesized that increasing the viscosity of the mineral material slows the deformation of the film so that the sample is less likely to form a hole and allow flame penetration during the test. Instead of measuring the viscosity of the mineral material at 774° C., it is more convenient to measure the softening point temperature which, for the glass compositions of interest, is fairly close to 774° C. The inventor does not know of previous work disclosing that increasing the viscosity of the mineral material at the test temperature increases the flame penetration resistance of the mineral fiber insulation in an insulated duct.

In view of the above, the goal was to increase the softening point of the mineral material while maintaining the other properties of the mineral material compatible with requirements for fiberizing by a typical rotary process (e.g., delta T and high temperature viscosity) and product requirements (e.g., thermal conductivity).

Increasing the softening point of the mineral material above that of conventional mineral material also increases the high temperature viscosity of the mineral material, as defined by its log 3 temperature. The "log 3 temperature" is the temperature at which the mineral material has a viscosity of 1,000 poise (roughly the fiberizing viscosity), where the viscosity is determined by measuring the torque needed to rotate a cylinder immersed in the molten material, according to ASTM Method C 965. The "liquidus temperature" of the mineral material is the temperature below which the first crystal appears in the molten mineral material when it is held at that temperature for 16 hours, according to ASTM Method C 829. The difference between the log 3 temperature and the liquidus temperature is called "delta T". The present invention limits the increase in the high temperature viscosity of the mineral material when its softening point is increased, so that the delta T is large enough to allow the mineral material to be fiberized by a typical rotary process. If the delta T is too small, the mineral material may crystallize within the fiberizing apparatus and prevent fiberization. Preferably, the delta T is at least about 42° C., more preferably at least about 83° C., and most preferably at least about 111° C. Preferably, the composition of the mineral material has a log 3 temperature of not greater than about 1121° C., and more preferably not greater than about 1093° C.

The present invention also retains the ability of the mineral material to produce an acceptable insulation product. For example, the insulating ability of the fibrous mineral material is kept at an acceptable level. The insulating ability can be measured as the thermal conductivity, k, of the fibrous mineral material. The lower the thermal conductivity, the better the insulating ability. Preferably, the fibrous mineral material has a thermal conductivity of not greater than about 0.043 W/m° K., and more preferably not greater than about 0.041 W/m° K. The thermal conductivity is measured on a sample of the fibrous mineral material having a density of 10.97 kg/m$^3$ and a thickness of 0.0381 m. For these samples the average fiber diameter, as measured by micronaire equipment, was of the order of 5.7 micrometers.

The increase in softening point of the mineral material can be achieved by adjusting the composition of the mineral material in a variety of ways. It has been found that the most efficient way is to reduce the total alkali content of the mineral material, where the "total alkali content" is defined as the total weight percent of the sodium oxide and potassium oxide in the mineral material. Preferably, the composition of the mineral material has a total alkali content of less than about 15% by weight, more preferably less than about 14.5%, more preferably less than about 14%, and most preferably less than about 13.5%. To limit the increase in high temperature viscosity, the magnesium oxide level may be kept to a minimum, preferably less than about 2.4% by weight, and more preferably less than about 0.5% by weight.

An insulated duct according to the invention includes a tubular wall defining a hollow interior for conducting a fluid such as heated or cooled air, and a layer of the insulation product wrapped about the wall to insulate the transported fluid. The insulated duct can be flexible or non-flexible, depending on the particular application of the duct. In a preferred embodiment, the tubular wall is flexible so that the duct is flexible.

In one embodiment of the invention, the insulated duct includes inner and outer flexible walls and an insulation layer between the walls. The flexible, tubular inner wall defines the hollow interior for conducting the fluid. Typically, the inner wall is a cylindrical tube having a diameter within a range of from about 10.2 cm to about 50.8 cm, usually from about 15.2 cm to about 30.5 cm. The insulation layer is wrapped about the inner wall to surround the inner wall. The flexible, tubular outer wall is wrapped about the insulation layer to provide an outer housing that surrounds the insulation layer and the inner wall and retains them in the proper orientation.

The inner and outer walls of the flexible duct can be formed of any suitable flexible material. Some examples of suitable materials include polymeric films made from thermoplastic polymers such as polyester, polyethylene, polyvinyl chloride or polystyrene. If desired, the polymeric film can be a metalized film. Other suitable materials include various fabrics or polymer-coated fabrics. Preferably, the inner wall is formed of a plastic film such as a polyester film, and the outer wall is formed of a plastic film such as a polyethylene film.

The density and thickness of the layer of insulation product can be varied depending on the fluid to be transported by the flexible duct and the permissible heat transfer rate through the walls of the duct. The layer of insulation product is typically glass fiber insulation having a thickness within a range of from about one inch (2.5 cm) to about three inches (7.5 cm). Preferably, the layer of insulation product is glass fiber wool about 3.8 cm thick before placement in the duct, and about 3.2 cm thick after being compressed between the inner and outer walls of the duct. In one embodiment, the insulation layer has an insulation R value of 0.741 m$^{2°}$ K/W.

The flexible duct usually includes a reinforcing element to provide structural rigidity to the duct. Typically, the reinforcing element is a continuous helically coiled, resilient wire extending along the length of the duct. The reinforcing element can be positioned at various locations in the duct, but typically it is either attached to or encapsulated in the inner wall of the duct. In a preferred embodiment, the reinforcing element is a helically coiled, resilient wire encapsulated in the plastic film of the inner wall. The reinforcing element can be formed of a metallic material such as steel, aluminum, a metal alloy, a plastic material, or a plastic-coated metallic material. Usually, the reinforcing element is formed of a wire spring steel. The diameter of the wire coils is dictated by the size of the duct.

Preferably, the flexible duct also includes a layer of scrim material to provide additional strength and reinforcement to the duct. The layer of scrim material is usually interposed between the outer wall and the layer of insulation. In a preferred embodiment, the layer of scrim material is wrapped about and laminated to the outer surface of the layer of insulation. The scrim material can be any suitable woven or non-woven material, but preferably it is a non-woven glass fiber scrim. In one embodiment, the scrim uses a G75 yarn having a rectangular pattern or a triangular pattern with a mesh size of about 1.27 cm.

A preferred structure for a flexible duct in accordance with the invention is shown and described in U.S. Pat. No.

4,410,014 to Smith, issued Oct. 18, 1983, which is incorporated by reference herein.

As discussed above, the insulated duct of the invention has an increased probability of passing the flame penetration test of the UL181 Standard, specifically Underwriter's Laboratories Inc. 181 Standard for Factory-Made Air Ducts and Air Connectors, Flame Penetration Section, 7th Edition, as revised Nov. 20, 1990. This test is described in detail in U.S. Pat. No. 5,526,849 to Gray, issued Jun. 18, 1996, which is incorporated by reference herein. Briefly, in the flame penetration test, the flexible duct is cut open and flattened, and a 55.9 cm by 55.9 cm sample of the duct is mounted in a frame. The frame is then placed over a flame at 774° C., with the outside face of the duct in contact with the flame. The sample is loaded with a 3.6 kg weight over an area 2.5 cm by 10.2 cm. Failure occurs if either the weight falls through the sample or the flame penetrates the sample. The duration of the test is 30 minutes.

EXAMPLE 1

Several embodiments of the glass fiber insulation product of the invention had the following glass compositions (in weight percent):

| Component | First Embodiment | Second Embodiment | Third Embodiment | Fourth Embodiment |
|---|---|---|---|---|
| $SiO_2$ | 67.9 | 65.6 | 68.3 | 65.9 |
| $Na_2O$ | 13.1 | 13.1 | 13.7 | 13.0 |
| CaO | 10.3 | 8.4 | 9.2 | 9.4 |
| $B_2O_3$ | 6.3 | 6.3 | 6.3 | 6.0 |
| $Al_2O_3$ | 1.4 | 2.2 | 1.4 | 2.2 |
| MgO | 0.1 | 3.1 | 0.1 | 2.0 |
| $K_2O$ | 0.7 | 1.1 | 0.7 | 1.0 |

The glass compositions had a total alkali content (sodium oxide plus potassium oxide) as follows: first embodiment 13.8%, second embodiment 14.2%, third embodiment 14.4%, and fourth embodiment 14.0%. (The compositions additionally contained minor components to total 100%.)

The compositions were fiberized by a rotary process to make glass fiber wool insulation products. The properties of the insulation products were as follows (data with an asterisk are predicted values):

| Property | First Embodiment | Second Embodiment | Third Embodiment | Fourth Embodiment |
|---|---|---|---|---|
| Softening point | 710° C. | 704° C. | 707° C. | 703° C. |
| Log 3 temperature | 1089° C. | 1094° C. | 1086° C. | 1081° C. |
| Delta T | 84° C. | 116° C. | 104° C. | 92° C. |
| Thermal conductivity | 0.0410 W/m° K.* | 0.0408 W/m° K.* | 0.0410 W/m° K.* | 0.0412 W/m° K.* |
| Fiber diameter (ave.) | 5.7 µm | 5.7 µm | 5.7 µm | 5.7 µm |

Flexible insulated ducts according to the invention can be prepared from these insulation products.

EXAMPLE 2 (COMPARATIVE)

A standard glass fiber insulation product, not prepared according to the present invention, had the following glass composition (in weight percent):

| Component | Standard Product |
|---|---|
| $SiO_2$ | 64.42 |
| $Na_2O$ | 14.90 |
| CaO | 8.71 |
| $B_2O_3$ | 5.25 |
| $Al_2O_3$ | 2.23 |
| MgO | 3.12 |
| $K_2O$ | 1.07 |

The standard product had a total alkali content (sodium oxide plus potassium oxide) of 15.9%. The composition was fiberized by a rotary process to make a glass fiber wool insulation product. The properties of the insulation product were as follows (data with an asterisk are predicted values):

| Property | Standard Product |
|---|---|
| Softening point | 690° C. |
| Log 3 temperature | 1059° C. |
| Delta T | 116° C. |
| Thermal conductivity | 0.0415 W/m° K.* |
| Fiber diameter (ave.) | 5.6 µm |

Flame penetration tests were run using a procedure similar to the UL-181 Flame Penetration Test Procedure. To better detect differences between the various samples, the tests were run for up to one hour instead of stopping at 30 minutes as is required in the UL-181 procedure. In this manner, we could not only measure the fraction of samples passing the test, i.e. lasting at least 30 minutes, but also get a better estimate of the average "time to failure". Time to failure in this case means the time it takes for either the flame to go through the sample or the weight to drop through the sample. This time can be much longer than the standard test duration of 30 minutes. Samples were cut from ducts prepared at the same time with either insulation having a composition as listed under "Standard Product" or insulation according to the invention, having a composition as listed under "Fourth Embodiment". Comparing flame penetration tests run on 16 samples of each showed that for the samples prepared according to the invention the fraction of samples failing the test was reduced by about 50% and that the average time to failure was increased by about 20%.

It should be understood that, although the invention has been described in terms of particular insulation products and particular insulated ducts, the invention is also applicable to other types of insulation products and insulated ducts.

The principal and mode of operation of this invention have been described in its preferred embodiments. However, it should be noted that this invention may be practiced otherwise than as specifically illustrated and described without departing from its scope.

What is claimed is:

1. An insulated duct for conducting a fluid comprising a tubular wall defining a hollow interior for conducting a fluid, and a layer of insulation product wrapped about the wall, the insulation product comprising fibrous mineral material that has been rotary fiberized, the composition of the mineral material having a softening point of at least about 699° C., the mineral material reducing the number of samples of the insulated duct failing a flame penetration test of a UL 181 Standard compared to the same insulated duct with a mineral material having a softening point of less than 699° C.

2. An insulated duct according to claim 1 wherein the mineral material reduces the number of samples of the insulated duct failing the flame penetration test by at least about 15%.

3. An insulated duct according to claim 1 wherein the composition of the mineral material has a delta T of at least about 42° C.

4. An insulated duct according to claim 1 wherein the composition of the mineral material has a log 3 temperature of not greater than about 1121° C.

5. An insulated duct according to claim 1 wherein the fibrous mineral material has a thermal conductivity of not greater than about 0.043 W/m° K.

6. An insulated duct according to claim 1 wherein the composition of the mineral material has a total alkali content of less than about 15% by weight.

7. An insulated duct according to claim 1 wherein the mineral material is glass, and wherein the composition of the glass has a softening point of at least about 703° C.

8. A method of improving the flame penetration resistance of an insulated duct, the insulated duct comprising a tubular wall defining a hollow interior for conducting a fluid, and a layer of insulation product wrapped about the wall, the insulation product comprising fibrous mineral material that has been rotary fiberized, the method comprising providing the mineral material with a softening point of at least about 699° C., the mineral material reducing the number of samples of the insulated duct failing the flame penetration test of a UL 181 Standard compared to the same insulated duct with a mineral material having a softening point of less than 699° C.

9. A method according to claim 8 wherein the mineral material reduces the number of samples of the insulated duct failing the flame penetration test by at least about 15%.

10. A method according to claim 8 wherein the composition of the mineral material has a delta T of at least about 42° C.

11. A method according to claim 8 wherein the composition of the mineral material has a log 3 temperature of not greater than about 1121° C.

12. A method according to claim 8 wherein the fibrous mineral material has a thermal conductivity of not greater than about 0.043 W/m° K.

13. A method according to claim 8 wherein the composition of the mineral material has a total alkali content of less than about 15.0% by weight.

14. A method according to claim 8 wherein the mineral material is glass, and wherein the composition of the glass has a softening point of at least about 703° C.

* * * * *